United States Patent [19]

Keppel

[11] 4,387,291
[45] Jun. 7, 1983

[54] FUEL HEATER SYSTEM AND SELF-REGULATING HEATER THEREFOR

[75] Inventor: Theo Keppel, Plainville, Mass.

[73] Assignee: Texas Instruments Incorporated, Dallas, Tex.

[21] Appl. No.: 210,955

[22] Filed: Nov. 28, 1980

[51] Int. Cl.³ .................. F02M 31/12; H05B 3/12; H01C 7/02

[52] U.S. Cl. ............................ 219/206; 123/543; 123/548; 123/549; 123/557; 219/275; 219/505; 219/530; 219/539; 219/540; 219/541; 261/142; 338/22 R; 338/320; 338/328

[58] Field of Search .............. 219/206, 207, 205, 504, 219/505, 530, 540, 541, 539, 544, 441, 442, 275; 261/142; 123/543, 548, 549, 590; 338/328, 22 R, 23, 320

[56] References Cited

U.S. PATENT DOCUMENTS

| | | | |
|---|---|---|---|
| 2,967,984 | 1/1961 | Jamison | 165/DIG. 8 |
| 3,375,774 | 4/1968 | Fujimura et al. | 219/505 |
| 3,719,796 | 3/1973 | Abildtrup | 219/504 X |
| 3,987,772 | 10/1976 | McBride | 219/206 X |
| 3,996,447 | 12/1976 | Bouffard et al. | 219/541 |
| 4,037,082 | 7/1977 | Tamada et al. | 219/505 X |
| 4,104,509 | 8/1978 | Van Bokestal et al. | 219/505 X |
| 4,177,375 | 12/1979 | Meixner | 219/504 X |
| 4,230,935 | 10/1980 | Meixner | 219/504 X |
| 4,237,077 | 12/1980 | Berg | 337/107 X |
| 4,242,999 | 1/1981 | Hoser | 123/549 X |
| 4,246,880 | 1/1981 | Henke et al. | 219/505 X |
| 4,313,413 | 2/1982 | Miyoshi | 123/549 |
| 4,325,344 | 4/1982 | Igashira et al. | 123/549 |
| 4,341,949 | 7/1982 | Steiner et al. | 219/441 X |

FOREIGN PATENT DOCUMENTS

| | | | |
|---|---|---|---|
| 2545430 | 4/1977 | Fed. Rep. of Germany | 123/549 |
| 2629610 | 1/1978 | Fed. Rep. of Germany | 123/549 |
| 54-47903 | 3/1979 | Japan | 219/505 |
| 55-37526 | 3/1980 | Japan | 123/549 |

Primary Examiner—A. Bartis
Attorney, Agent, or Firm—James P. McAndrews; John A. Haug; Melvin Sharp

[57] ABSTRACT

A self-regulating heater for use in an early fuel evaporation system for an automotive engine includes a metallic radiator having a first heat-receiving side and an opposite side for transferring heat to a fuel evaporization zone. Self-regulating ceramic electrical resistance heater elements having a positive temperature coefficient of resistivity(PTC) are disposed with first sides in facing relation with respective recessed first portions of the heat-receiving side of the radiator. A thermally conducting metal heat-transfer member has recessed first portions disposed in facing relation to respective second sides of the heater elements to receive heat second sides of the heater elements to receive heat from the second sides of the heaters and also has second portions disposed in closely-spaced facing relation to corresponding second portions of the heat-receiving side of the radiator, thereby to transfer the heat received from the second heater sides to the radiator. Electrically and thermally conductive metal wave springs disposed in the recessed first portions of the radiator and heat-transfer member electrically connect the heater elements in parallel to the radiator and heat-transfer member which are connected to the automotive power source to supply heating current to the heater elements. The recessed first portions containing the heater elements and spaces between the second portion of the metal heat-transfer member and radiator are filled with a thermally conducting, electrically insulating, silicone-based compound so that the heater provides improved heat transfer from both sides of the self-regulating ceramic heater elements to the radiator to achieve improved heating efficiency and reduced power drain on the automotive power source.

6 Claims, 3 Drawing Figures

FUEL HEATER SYSTEM AND SELF-REGULATING HEATER THEREFOR

BACKGROUND OF THE INVENTION

The field of this invention is that of electrical heaters and the invention relates more particularly to self-regulating heaters having electrical resistance heater elements of a ceramic material of positive temperature coefficient of resistivity and to early fuel evaporation systems for automotive engines using such heaters.

Conventional early fuel evaporation (EFE) systems for automotive engines incorporate electrical heaters for heating the air-fuel mixture passing to the engine during the engine warm-up period, thereby to enhance fuel evaporation on a cold day to assure smooth engine starting or to reduce exhaust pollution emissions. The heaters usually incorporate electrical resistance heater elements of a thin disc shape formed of a ceramic material or positive temperature coefficient of resistivity and the ceramic material is usually adapted to display a sharp increase in resistance when the heater self-heats above a particular transition temperature. The transition temperature is usually on the order of 80°–180° C. and is characteristic of the selected ceramic material. Such heater elements are self-regulating in that they display progressively increasing resistance and reduced heat output as the heater temperature increases until the heater temperature stabilizes at the level where the reduced rate of heat output from the element is balanced by the rate of heat dissipation from the element.

In certain well known EFE systems, the heater includes a metal radiator having one heat-transferring side provided with heat-distributing rods or fins. The heater is mounted in an automotive fuel supply system so that the heat-transferring side of the radiator is disposed in heat-transfer relation to the air-fuel mixture being passed through the system to the engine. Typically, the heater is mounted in the intake manifold of the engine beneath the air-fuel supply passage of the carburetor so that any unvaporized fuel droplets which enter the intake manifold tend to fall on the heat-transferring side of the radiator and so that the air-fuel mixture fed into the intake manifold from the carburetor passes over the rods or fins on the radiator. In that known type of heater device, the thin ceramic heater disc elements are located on an opposite, heat-receiving side of the radiator member so that the heat generated by the elements is transmitted through the metal radiator member to heat the air-fuel mixture passing through the intake manifold. Usually, one flat side of each of the thin ceramic heater discs is secured in electrically and thermally conducting relation to the heat-receiving side of the radiator and the radiator is connected to electrical ground. Electrical terminal means then engage the respective opposite sides of the heater discs for electrically connecting the resistance heater elements in parallel relation to each other. In that arrangement, the heaters are conveniently energized from the battery or generator power source of the automotive engine when the engine is started by closing of the ignition switch and are adapted to provide a desired heating effect to the air-fuel mixture during cold weather to achieve smooth engine performance during start up. The heating effect also serves to reduce emission of pollutants such as unburned hydrocarbons from the engine exhaust.

However, it is found that the noted heaters impose a significant load on the power supply capacity of the automotive engine during the engine start-up period. This is particularly true in that provision has to be made to reserve a sufficient part of the power supply capacity to meet the peak current demand by the heaters when they are in their high current mode as initial engine starting occurs while also adapting the power supply system to meet the needs of many other electrically-operated automobile components.

It is an object of this invention to provide a novel and improved self-regulating heater device; to provide such a heater device which is particularly adapted for use in an early fuel evaporation system for an automotive engine; to provide such a heater device which is adapted to provide a desired heating effect with reduced peak current demand characteristics; and to provide a novel and improved fuel supply system for an automotive engine utilizing such a heater device.

BRIEF SUMMARY OF THE INVENTION

Briefly described, the novel and improved self-regulating heater device of this invention as used in the novel and improved fuel supply system of this invention includes a thermally conducting metal radiator means having a first heat-receiving side and second, opposite side for transferring heat to a zone to be heated. Preferably, the radiator means comprises a cast member of aluminum or other thermally and electrically conductive metal material having a wall extending around the heat-receiving side of the member to form an open-ended chamber, having mounting means such as a flange extending around the rim of the chamber wall, and having a plurality of heat-distributing rods or fins extending from the outer heat-transferring side of the cast member.

Self-regulating electrical resistance heater elements of a ceramic material of positive temperature coefficient of resistivity are formed in a thin disc shape with oppositely facing first and second disc sides. The heaters are disposed with the first disc sides in facing relation to respective first portions of the inner heat-receiving side of the radiator member for transferring heat from the first disc sides to the radiator. Preferably, the noted first portions of the radiator member are recessed. Resilient, electrically and thermally conductive wave springs are disposed in the respective recesses in resilient engagement with the first disc sides and with the radiator for electrically connecting the first sides of the electrical resistance heater elements to the metal radiator.

In accordance with this invention, a thermally conducting metal heat-transfer member preferably formed of aluminum or the like is disposed with first portions thereof in facing relation to the respective second sides of the heater discs for receiving heat from the second sides of the discs. The heat transfer member also has second portions which face corresponding second portions of the heat-receiving side of the radiator and which serve to transfer the heat received from the second sides of the heaters to the radiator. In a preferred embodiment, the heat-transfer member comprises a plate fitted into the open end of the radiator chamber in electrically insulated relation to the radiator and the noted first portions of the heat-transfer member are also recessed. Electrically and thermally conducting metal wave springs are disposed in those recesses in resilient electrical engagement with the heat-transfer member and with the second sides of the heater discs. The spaces between the heater disc sides and the respective first portions of the radiator and heat-transfer member as well as the spaces between the noted second portions of the radiator and heat-transfer members are filled with a thermally conducting, electrically insulating filler compounds such as silicone-based grease or the like for facilitating the transfer of heat from each of the heater disc sides to the adjacent radiator or heat-transfer member and for facilitating the transfer of heat from the heat-transfer member to the heat-receiving side of the radiator. Preferably, retaining means received in the wall of the radiator chamber secure the heat-transfer member in the open end of the radiator chamber to hold the heater elements, springs and filler compound in the desired assembled relation as described.

In that arrangement, the heater device is mounted in a fuel supply system for an automobile engine to dispose the heat-transferring side of the radiator means to transfer heat to the air-fuel mixture being furnished to the engine, thereby to produce a desired degree of heating for the air-fuel mixture. The radiator member is connected to electrical ground and the heat-transfer member is electrically connected to the power source associated with the automobile engine so that, when the engine is started, the heater elements are electrically energized in parallel relation to each other. That arrangement also assures that the heater disc elements generate heat efficiently and efficiently transfer that heat to the air-fuel mixture to produce the desired heating effect. That is, because of the radiator and heat-transfer member are arranged to receive the transfer of heat from both sides of the heater elements, and because the use of the thermally conducting filler compound enhances such heat transfer from the disc heaters to the metal members, a significantly greater amount of heat is generated by the heaters before bands of the ceramic heater material reach the transition temperature at which the bands of material display sharp increase in resistivity and lower the heater current. Further, the heat which is transferred to the heat-transfer member from the second sides of the heater discs is efficiently transferred to the radiator member through the filler compound disposed between the radiator and heat transfer members. Accordingly, a greater amount of heat is provided by each heater element during the engine warm-up period for warming the air-fuel mixture. As a result, fewer or smaller heater elements are needed to provide a desired air-fuel heating effect. Therefore, the peak current load imposed on the automotive power supply by the heater means in the fuel supply system of this invention is correspondingly reduced.

DESCRIPTION OF THE DRAWINGS

Other objects, advantages and details of the novel and improved heaters and fuel supply systems of this invention appear in the following detailed description of prefered embodiments of the invention, the detailed description referring to the drawings in which.

DESCRIPTION OF THE PREFERRED EMBODIMENTS

Figure 1:
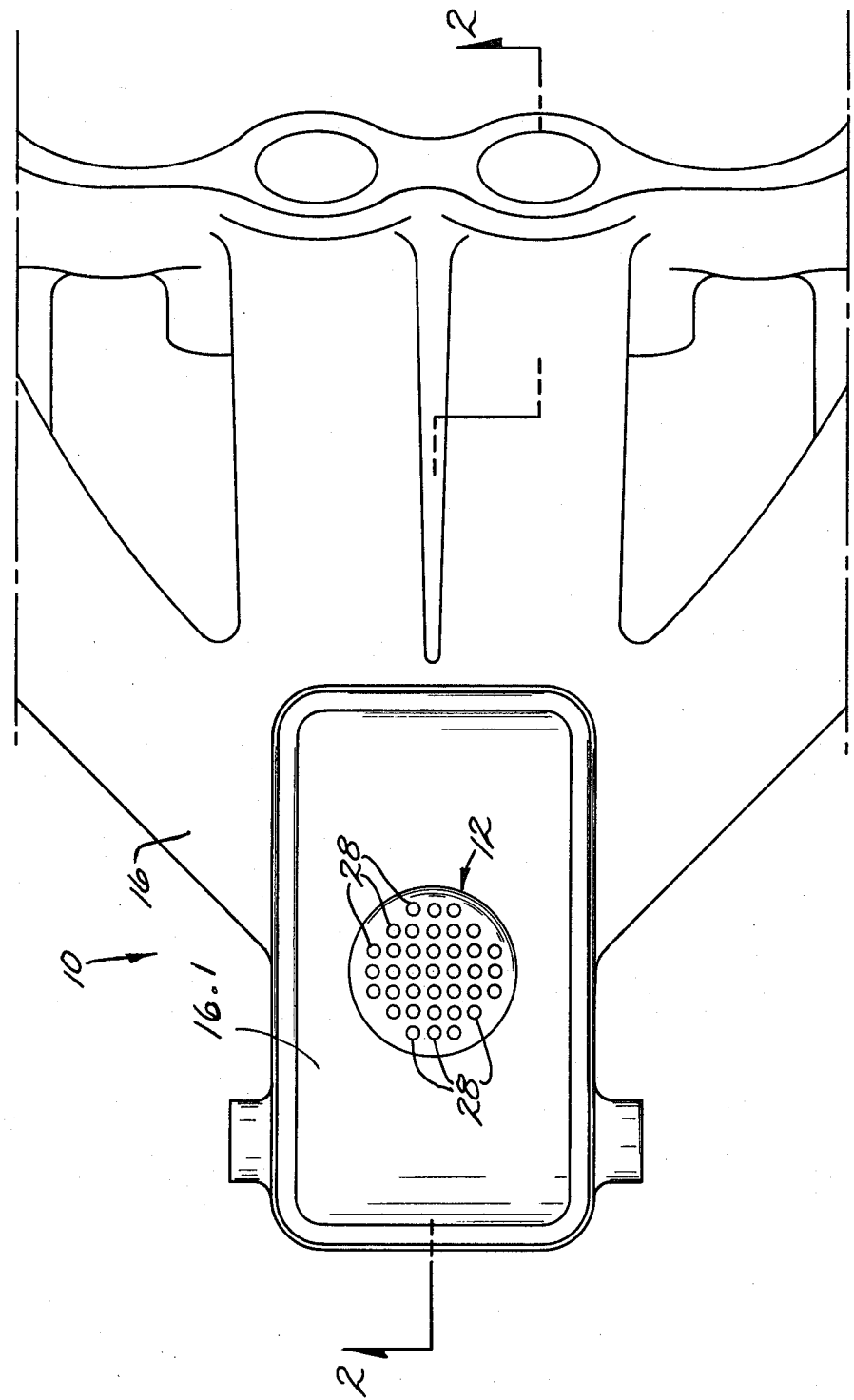
FIG. 1 is a plan view of the self-regulating heater and fuel supply system of this invention diagrammatically showing the heater mounted in an otherwise conventional fuel supply system of an automotive engine.
Figure 2:
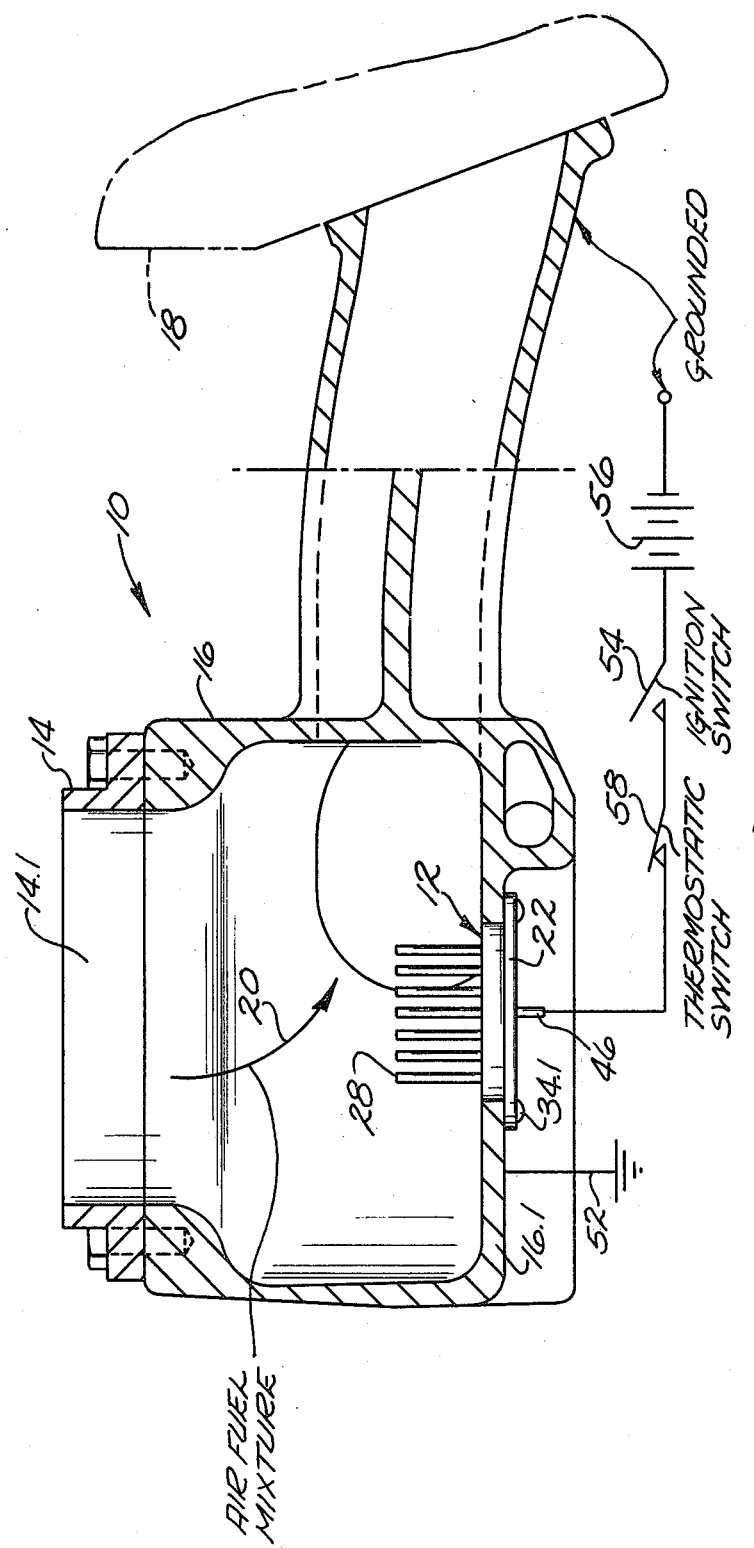
FIG. 2 is a section view along line 2—2 of FIG. 1 schematically illustrating connection of the heater in an electrical circuit in an automobile.
Figure 3:
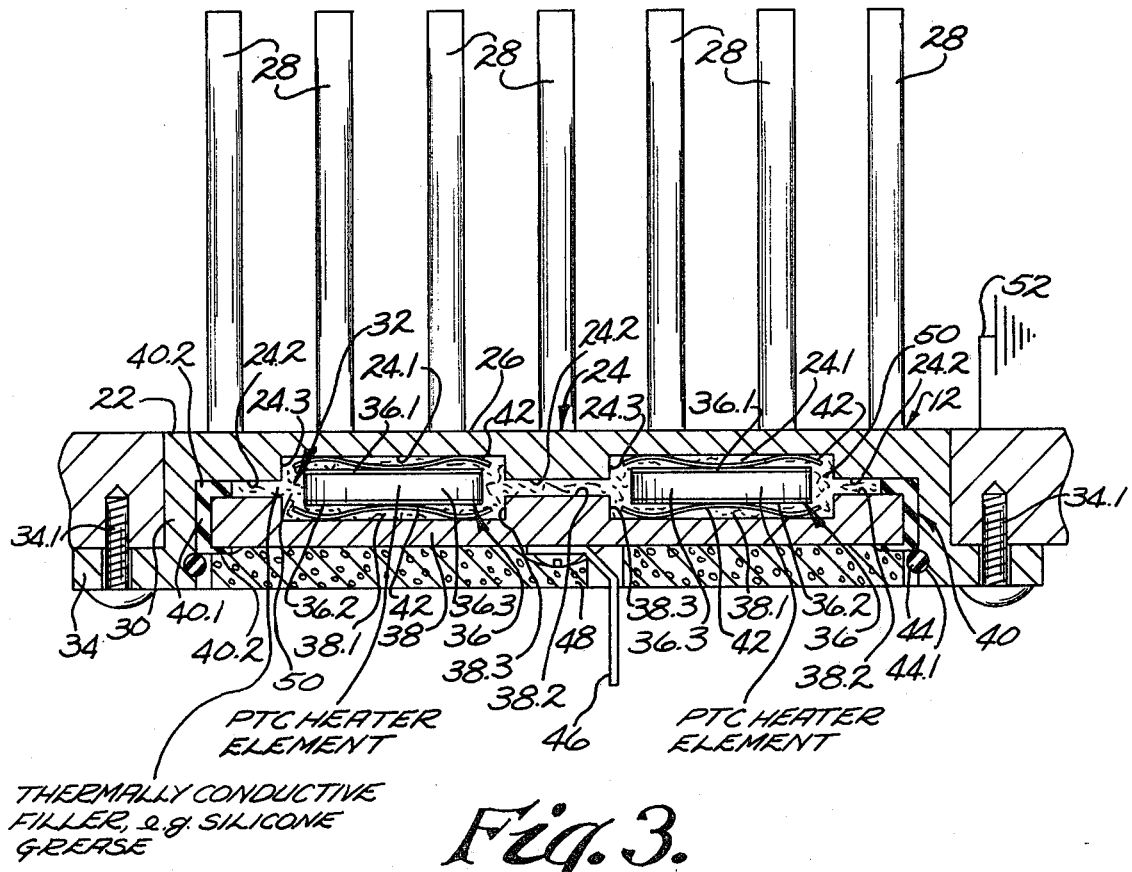
FIG. 3 is a partial section view similar to FIG. 2 to enlarged scale illustrating the components of the heater shown in FIGS. 1 and 2.

Referring to the drawings, 10 in FIGS. 1-3 indicates the novel and improved fuel supply system of this invention which is shown to include a novel and improved self-regulating heater device 12 mounted together with the usual components of an otherwise conventional automotive fuel supply system so that the heater is operable to transfer heat to an air-fuel mixture being passed through the system to an automotive engine, thereby to enhance fuel evaporation on a cold day to assure smooth engine starting and/or to reduce the emission of pollutants such as unburned hydrocarbons in the engine exhaust. In a preferred embodiment of this invention for example, the fuel supply system includes carburetor means 14 mounted on an intake manifold means 16 of an automotive engine 18 for supplying an air-fuel mixture to the engine as is diagrammatically indicated in FIG. 2 by the arrow 20. In that arrangement, the heater device 12 is preferably mounted in the bottom wall 16.1 of the manifold beneath the air-fuel supply passage 14.1 of the carburetor so that the air-fuel mixture passes in heat-transfer relation to the heater device 12 as the mixture passes to the engine. As the carburetor, intake manifold and engine means are conventional and as the heater device 12 is disposed in the fuel supply system in a generally conventional location with respect to those conventional components within the scope of this invention, the conventional system components are not further described herein and it will be understood that the system 10 is adapted to supply an air-fuel mixture to the engine to meet engine requirements and the heater device 12 in the system is adapted to transfer heat to the mixture to provide a desired heating effect for improving engine starting and/or for reducing exhaust pollutant emissions from the engine.

In accordance with this invention, the novel and improved heater device 12 includes a thermally conducting metal radiator means or member 22 or the like having a first heat-receiving side 24 and having a second, opposite, heat-transferring side 26 for transferring heat from the radiator member to a zone 27 to be heated. Preferably, the radiator member comprises a cast unit or the like of aluminum, copper or other thermally conductive metal material having a plurality of heat-distributing rods or fins 28 or the like upstanding from the heat-transferring side of the radiator to enhance heat-transfer from the radiator to the zone 27.

In a preferred embodiment of the invention, the radiator member 22 preferably includes a generally annular wall 30 extending around the heat-receiving side 24 of the radiator to form an open-ended chamber 32. Preferably, a flange 34 or the like is provided on the wall extending around the rim of the open-chamber for use with the mounting screws 34.1 or the like in mounting the heater device 12 on the intake manifold 16 as is shown in FIGS. 2 and 3.

In accordance with this invention, at least one and preferably a plurality of self-regulating heater elements 36 are disposed as shown in FIG. 3 with first sides 36.1 of the elements in facing relation to respective first portions 24.1 of the heat-receiving side 24 of the radiator member 22 for transferring heat from the first sides of the heater elements to the radiator. A heat-transfer member 38 also formed of a thermally conducting metal material such as aluminum, copper or the like is mounted so that first portions 38.1 of the heat-transfer member are disposed in facing relation to respective, second, opposite sides 36.2 of the self-regulating heater elements for receiving heat from the second sides of the heater elements. The heat-transfer member also has second portions 38.2 which are disposed in facing relation to corresponding second portions 24.2 of the heat-receiving side of the radiator member for transferring heat received from the second heater sides to the radiator member 22. Preferably, the heat-transfer member 38 is mounted in electrically insulated relation to the radiator member 22 and the radiator member and heat-transfer members are electrically connected to the respective opposite sides of the heater elements 36, whereby the metal members serve to electrically connect the heater elements in parallel relation to each other in an electrical circuit.

In a preferred embodiment of this invention for example, each of the heater elements 36 is formed of a thin, disc-shaped body 36.3 of a ceramic, electrical resistance material or the like of a positive temperature coefficient of resistivity having layers of metal provided on the disc sides 36.1 and 36.2 in any conventional manner for providing ohmic electrical contact to the ceramic resistance material. Preferably, the ceramic material comprises a yttrium-doped barium titanate material of any conventional composition having a Curie or transition temperature of 180° C. or the like above which the material displays a sharply increasing electrical resistance with increasing element temperature.

The first portions 24.1 of the heat-receiving side of the radiator member 22 are preferably recessed as at 24.3 in FIG. 3 and the first portions 38.1 of the heat-transfer member are also provided with similar recesses as shown at 38.3 in FIG. 3. The heat-transfer member is provided with a generally round shape and, as shown in FIG. 3, a sleeve 40 of an electrical insulating material such as polyethylene or the like, preferably having a channel-shaped crossed section with a web 40.1 and with flanges 40.2, is fitted around the periphery of the heat-transfer member. A plurality of thermally and electrically conductive wave springs 42 are also provided.

The heater elements 36 are disposed in the radiator chamber 32 and the heat-transfer member 38 is fitted into the open end of the chamber 32 over the heater elements so that the insulating sleeve 40 electrically insulates the heat-transfer member from the radiator 22. The wave springs 42 are disposed in recesses 24.3 and 38.3 in resilient electrical engagement with respective heater disc sides 36.1 and 36.2 and with the adjacent radiator or heat-transfer members as shown in FIG. 3. Preferably, a split-ring spring retaining ring 44 or the like is fitted into groove 44.1 in the radiator chamber wall 30 for securing the heat-transfer member 38 in the chamber 32, thereby to hold the heater elements 36 and wave springs 42 in assembled relation as above-described and to dispose the portions 38.2 and 24.2 of the metal heat-transfer and radiator members in closely spaced facing relation to each other. Preferably, a terminal connector 46 is attached to the heat-transfer member and a layer 48 of any conventional insulating material such as glass form or fiber insulation is cemented or otherwise secured in the open chamber end over the heat-transfer member as shown in FIG. 3.

In accordance with this invention, the heater device 12 further includes a thermally conducting filler means 50 which is disposed in the radiator chamber 32 in the spaces between the heater discs sides 36.1 and 36.2 and the adjacent radiator or heat-transfer members as well as in the spaces between the portions 24.2 and 38.2 of the radiator and heat-transfer members. Preferably for example, the thermally conducting filler means comprises a thermally conducting, electrically insulating silicone-based grease or the like which fills the radiator chamber 32 and completely surrounds each of the heater elements 36 to fill all of the space in the chamber around the peripheries of the heater discs, between the sides of each disc and the adjacent metal members around the wave springs 42, and between substantially all facing portions of the radiator and heat-transfer members. Preferably, the filler compound includes any of the various silicone materials such as dimethyl silicone or other methyl-alkyl silicones or the like which are chemically inert with respect to the ceramic materials embodied in the heater elements 36 and which are stable and preferably shape-retaining in the temperature range from about 100° to 180° C. Other thermally conducting electrically insulating compounds such as powder materials or the like are also adapted for use in the heater device 12 within the scope of this invention.

In that construction, mounting of the heater device 12 on the intake manifold 16 as shown in FIGS. 2 and 3 disposes the heat-transferring side 26 of the radiator member 22 in heat-transfer relation to the zone 27 within the manifold. That mounting also serves to electrically ground the radiator member 22 to the engine as is diagrammatically indicated at 52 in FIG. 2. Accordingly, the terminal connector 46 on the heater device is easily connected through the ignition switch 54 or the like to the battery, generator or other power source means of the automobile engine diagrammatically indicated at 56 so that the heater elements 36 are electrically energized in parallel relation to each other whenever operation of the engine 18 is initiated. If desired, a conventional thermostatic switch 58 is incorporated in the noted circuit as is diagrammatically shown in FIG. 2, the thermostat switch being normally closed when the temperature of the engine 18 is below a selected temperature level but being adapted to open the circuit in response to heating of the engine to its normal operating temperature after engine warm up occurs.

In that arrangement, when the heater elements 36 are first energized as operation of the engine 18 is initiated on a cold day, heat which is generated in the ceramic heater material in the heater elements near the heater disc sides 36.1 is efficiently withdrawn from the disc sides 36.1 through the wave springs 42 and filler compound 50 disposed between the disc sides 36.1 and the adjacent radiator. Similarly, the heat generated in the ceramic material in the elements near the other disc sides 36.2 is also efficiently withdrawn from the heater elements through the wave springs 42 and filler compound 50 disposed between the disc sides 36.2 and the heat-transfer member 38. That withdrawal of heat from both sides of the discs slows the increase in temperature of the heater material and delays the forming of bands of high resistance material above the noted transition temperature which would lower heat output from the elements. Accordingly, the heater elements continue to operate near their initial peak output rate for a longer period of time during the engine warm-up period. The heat withdrawn from the second heater sides is also transferred quite efficiently through the thermally conducting filler compound 50 to the radiator 22 to make its contribution in heating the air-fuel mixture 50. As a result, the heating device 12 and the fuel supply system 10 provide improved fuel vaporization on a cold day or, alternately, are adapted to achieve a desired heating effect relative to the air-fuel mixture using fewer heating elements on that the heaters impose a lesser peak drain on the power supply capacity of the automotive engine. In one known application of the heater device 12, the required heating effect which had previously required use of four heating elements with resulting high initial power drain was achieved using only three otherwise comparable heater elements with significantly reduced initial power drain.

It should be understood that although particular embodiments of the heater device and fuel supply system of this invention have been described above by way of illustrating the invention, many modifications of the described embodiments are possible within the scope of this invention. For example, the first or second sides of the heater elements are adapted to be soldered or epoxied in thermally and electrically conducting relation to the radiator or heat-transfer members within the scope of this invention. This invention includes all modifications and equivalents of the described embodiments falling within the scope of the appended claims.

I claim:

1. A self-regulating heater device for a system for supplying an air-fuel mixture to an internal combustion engine comprising;

a thermally conducting metal radiator member having a first heat-receiving side and having a second, opposite side for transferring heat to at least one component of the air-fuel mixture, means for mounting the radiator member in the fuel supply system to dispose the second, heat-transferring side of the member to heat at least said one component of the air-fuel mixture, and at least one self-regulating electrical resistance heater element of a ceramic material of a positive temperature coefficient of resistivity having oppositely facing first and second sides, the element being disposed with the first side in facing relation to a first portion of the heat-receiving side of the radiator member for transferring heat from the first side of the heater element to the radiator member, characterized in that:

a plurality of said ceramic heater elements are disposed with said first sides thereof in facing relation to respective first portions of the heat-receiving side of the metal radiator member;

a thermally conducting metal heat-transfer member has a plurality of first portions mounted in facing relation to the second sides of the respective heater elements receiving heat from the second element sides and has second portions disposed in spaced facing relation to corresponding second portions of the heat-receiving side of the radiator member transferring heat received from the second sides of the heater elements to the radiator member;

resilient conductive means are disposed between each of the heater element sides and a respective one of the metal members and the metal members are secured together in electrically insulated relation to each other holding the resilient conductive means in resilient electrical engagement with the respective heater element sides;

a thermally conducting filler is disposed in the space between said facing second portions of the metal members to facilitate transfer of heat from the heat-transfer member to the radiator member, the filler comprising a silicone based electrically insulating material; and said first portions of the metal radiator and heat-transfer members are recessed, and said resilient conductive means comprise wave springs which are disposed in the respective recessed portions of the metal members positioning the springs in resilient electrical engagement with the heater sides and with the metal members to electrically connect the heater element sides to the respective members, the thermally conducting electrically insulating filler means being disposed in the recessed portions of the metal members to facilitate heat transfer from the heater elements to the metal members.

2. A self-regulating heater device as set forth in claim 1 further characterized in that said radiator member has wall means extending around the heat-receiving side of the radiator member to form an open-ended chamber, the heat-transfer member is fitted within said open-ended chamber in electrically insulated relation to the radiator member holding the heater elements, springs and filler means within the chamber, and retaining means are fitted within said wall means at said open chamber end securing the heat-transfer member in the chamber.

3. A self-regulating heater device as set forth in claim 2 further characterized in that an annular ring of electrical insulating material having a channel-shaped cross section with a web and a pair of flanges is fitted around the heat-transfer member with the web and flanges engaging peripheral and side portions of the heat-transfer member electrically insulating the heat-transfer member from the radiator member.

4. A self-regulating heater device as set forth in claim 3 having thermal insulating means disposed over the heat-transfer member at the open chamber end to enhance transfer of heat from the heating elements to the radiator member.

5. A fuel supply system for an internal combustion engine comprising carburetor means supplying an air-fuel mixture to the engine, a thermally conducting metal radiator member having a first heat-receiving side and having a second, opposite side for transferring heat to at least one component of the air-fuel mixture provided by the carburetor means, means mounting the radiator member in the system to dispose the second radiator side to transfer heat to at least said one component of the air-fuel mixture to produce a desired degree of heating thereof, a plurality of self-regulating ceramic heater disc elements of a ceramic material of positive temperature coefficient of resistivity which are adapted to display a sharp increase in resistance when heated above a selected transition temperature and which have oppositely facing first and second sides with metal contact layers thereon, the elements being disposed with said first sides thereof in facing relation to respective first portions of the heat-receiving side of the metal radiator member, for transferring heat from the first side of the heater discs to the radiator member, power source means for electrically energizing the heater elements to produce heating of said component of the air-fuel mixture, a thermally conducting metal heat-transfer member having first portions mounted in facing relation to the second sides of the heater disc elements receiving heat from the second element sides and having second portions disposed in spaced facing relation to corresponding second portions of the heat-receiving side of the radiator member transferring heat received from the second disc sides to the radiator member, said first portions of the metal radiator and heat-transfer members being recessed, resilient conductive wave springs disposed in the respective recessed portions of the metal members in resilient electrical engagement with respective heater sides and respective metal members to electrically connect the heater elements in parallel relation to each other, and a thermally conducting electrically insulating silicone-base filler compound disposed in the recesses between the disc sides and the metal members to facilitate heat transfer from the heater discs to the members.

6. A fuel supply system as set forth in claim 5 further characterized in that the radiator member has a wall extending around the heat-receiving side of the member defining an open-ended chamber, the heat-transfer member is fitted within the open-ended chamber in electrically insulated relation to the member holding the heater elements, springs and filler compound within the chamber, retaining ring means are fitted into said wall securing the heat-transfer member in the open chamber end, flange means in the wall mount the radiator member in the system, and thermal insulating means are disposed over the open chamber end to improve the efficiency of transfer of heat from the heating elements to the radiator member.

* * * * *